Feb. 4, 1964 D. WEIGHTON ETAL 3,120,652
AUTOMATIC CONTROL ARRANGEMENT
Filed July 13, 1960
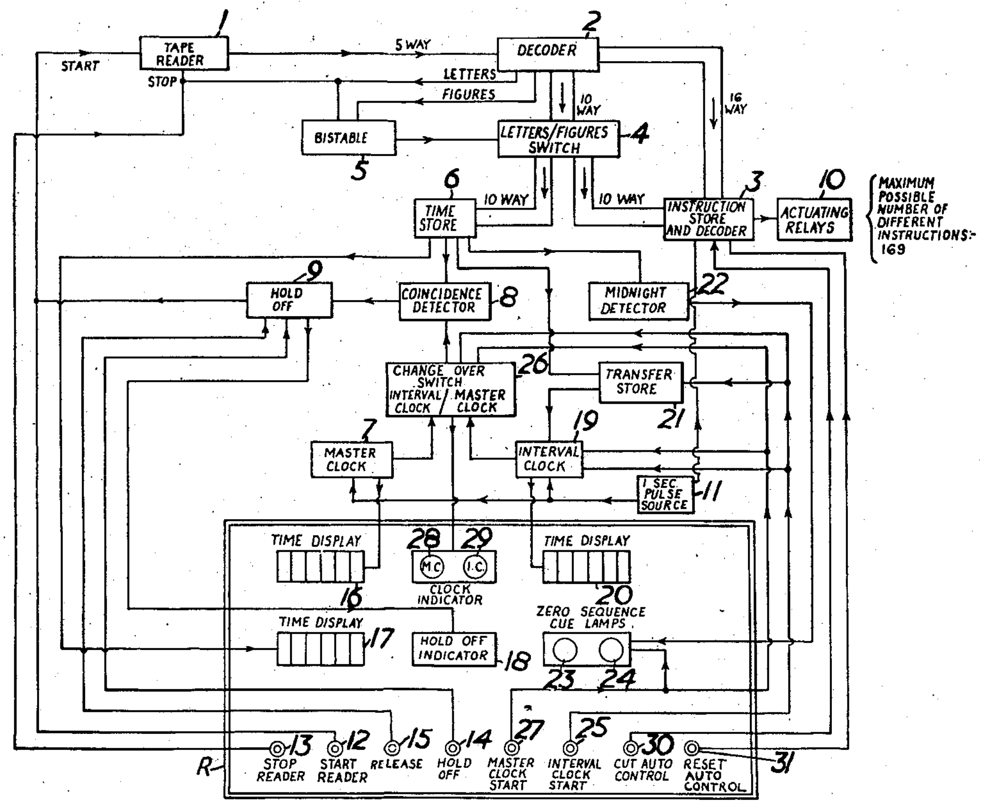
Inventors
DONALD WEIGHTON
TOM A.H. MARSHALL
By
Holcombe, Wetherill & Brisebois
Attorneys United States Patent Office 3,120,652

Patented Feb. 4, 1964

3,120,652
AUTOMATIC CONTROL ARRANGEMENT

Donald Weighton, Cambridge, and Tom A. H. Marshall, Norfolk, England, assignors to Pye Limited, Cambridge, England, a British company Filed July 13, 1960, Ser. No. 42,540
Claims priority, application Great Britain July 17, 1959
2 Claims. (Cl. 340—147)

The present invention relates to an electronic automatic control arrangement for automatically controlling a sequence of operations so that they are carried out at desired predetermined times.

According to the present invention the arrangement comprises a device for reading recorded information from a recording medium carrying information representing a series of instructions and the times at which each instruction is to be put into operation, timing means for comparing the time at which the recorded instructions are to be put into operation with actual time and operating means for causing the instructions to be put into operation when the actual time and the time for each instruction on the recording medium coincide.

The recording medium can be of any desired kind but advantageously may comprise a punched tape, the holes in the tape being arranged according to a code each sequence of which consists of a part representing the time at which an instruction is to be put into operation and a part representing the nature of the instruction.

The timing means preferably includes a time store fed from the reading device which stores the times represented on the recording medium and a master clock for giving the actual time and a comparator arrangement which compares the time of an instruction stored in the time store with the time on the master clock and which causes the instructions to be carried out when the two times coincide. After any instruction has been carried out the time of the next instruction recorded on the tape is fed to the time store. The time store may consist of a cold cathode tube store which can register any time in a twenty-four period to the nearest second. The master clock may also consist of a cold cathode tube store fed by pulses at one second intervals from a suitable pulse source.

The reading device may feed the time store through a decoder which also feeds the nature of the instruction to a further instruction store and decoder which in turn causes the instructions to be put into operation upon coincidence occurring between the time recorded in the time store and the actual time on the master clock. The instructions may be put into operation by causing the decoder associated with the instruction store to produce signals operating switches, relays or other devices.

A switching arrangement may be provided which is operated by the decoder fed by the reading device selectively to feed the recorded information representing a time at which an instruction is to be put into operation to the time store and the nature of the instruction to the instruction store.

According to a feature of the invention the arrangement includes means enabling the time recorded on the recording medium for any instruction to be carried out to be advanced or retarded.

The arrangement may also include further timing means which are used to control the carrying out of instructions over a given time period of limited duration commencing at any desired time during the operation of the equipment which cannot be predetermined when the instructions are being set up on the recording medium. The arrangement according to the present invention may be employed in any application where it is necessary to ensure that a predetermined sequence of operations are carried out at specific times.

The invention may advantageously be employed automatically to control the sequence of operations necessary for the transmission of a series of television programmes and thereby simplify the duties of the master controller at the television station. At present the duties of the master controller include the selection of video signals and/or sound signals from any one of a plurality of studios, telecine channels, tape recorder channels, slides, clocks, effects and announcer studios or other sources and since the sound signals are not always derived from the same source as the video signals comprehensive cues must be given. The task of the master controller can therefore be very complex at certain busy periods during a television transmission necessitating the use of additional trained personnel but at other times when a long programme is emanating solely from one studio or other source there may be little for the master controller to do apart from normal monitoring. By employing the arrangement according to this invention a large proportion of the master controller's duties are performed automatically thereby simplifying his task, and the additional trained personnel which are otherwise needed to cope with busy periods are no longer necessary.

A particular embodiment of the invention will therefore now be described as applied to the control of television programmes at a television station and with reference to the accompanying drawing which is a circuit diagram of one arrangement according to this invention.

The automatic control arrangement shown in the drawing enables the selection and transmission of the various signal sources making up a television programme or sequence of television programmes to be effected automatically at the appropriate times and enables the programme switching and cueing to be preset for a given period, e.g. twenty-four hours, whilst allowing the master controller to adjust the predetermined sequence to allow for under-running or over-running of any particular programme, or to insert special announcements. Moreover if necessary the master controller can take over manual control of the programmes for any period of time.

In the illustrated embodiment the times and instructions to be recorded are recorded on a punched tape having rows of holes punched across the tape according to a code indicating each time element and symbol of an instruction. Such punched tape systems are well-known and information to be stored on the tape may be arranged according to the international five hole code as indicated below.

| | | | | | |
|---|---|---|---|---|---|
| 0 | 0 | | 0 | 0 | Precede Figures code |
| 0 | 0 | 0 | | 0 | Hours |
| 0 | | | 0 | 0 | |
| 0 | 0 | | | 0 | Minutes |
| 0 | | | | | |
| 0 | 0 | 0 | | 0 | Seconds |
| | 0 | 0 | | 0 | |
| 0 | 0 | 0 | 0 | 0 | Precede Letters code |
| | 0 | 0 | | 0 | Two letter instruction code |
| 0 | | 0 | 0 | 0 | |

It will be seen that this code sequence occupies ten rows of holes on the tape as follows. The first row of holes indicates that the following information represents figures, the second to seventh rows of holes represent the hours, minutes and seconds of the time at which an instruction is to be put into operation, the eighth row of holes indicates that the following information represents letters whilst the ninth and tenth rows of holes represent a two letter code indicating the nature of the instruction to be carried out. If more than one instruction is to be put into operation at the same time, further instructions can be added at the end of the sequence as further two letter code groups without repeating the time.

In practice it is not desirable to use the same letter in both positions of the two letter instruction code so that the maximum possible number of different instructions with this arrangement is obtained by assigning thirteen different letters to each of the two positions of the two letter instruction code, thus enabling a maximum of 169 different instructions to be recorded. By using different letters in the two positions of the code it is possible to simplify the routing of the instruction signals and it also automatically avoids possible misdirection of a letter to the wrong store.

The punched code can be produced on the tape automatically during the typing of the cue sheet for any television programme or programmes by arranging for the typewriter to effect the desired punching of the tape during the periods when the time of any instruction and the code representing that instruction is being typed on the cue sheet. The tape punching mechanism is however inoperative whilst the typewriter enters other information on the cue sheet such as the wording of the instruction or the duration of any part of the programme.

The time for each instruction is preferably given relative to a twenty-four hour clock and the recording tape is preferably prepared to cover instructions for a whole day's programmes from midnight to midnight.

When the desired information has been entered on the punch tape this is inserted in the tape reader 1, ready for the automatic control arrangement to be operated. The tape reader has five connections which feed the decoder 2 which is a relay tree and has twenty-eight output connections, as follows. Sixteen output connections representing letters are taken directly to the instruction store and decoder 3 whilst ten output connections representing letters or figures are taken to the letters/figures switch 4 which is a ten-pole two-position switch controlled by a bistable circuit 5 either to route the ten outputs, if figures, to the time store 6 or if letters to route the ten outputs to the instruction store and decoder 3. The bistable circuit is itself controlled by two outputs from the decoder fed with the precede figure code and precede letter code signals.

When the tape reader 1 begins to operate, the signals derived from the first row of holes representing the precede figure code will pass via the decoder 2 and operate the bistable circuit 5 to connect the switch 4 to the time store 6 so that the signals derived from the next six rows of holes on the tape representing the hours, minutes and seconds at which an instruction is to be carried out are fed to this store. The next row of holes represents the precede letter code and the signals derived from these holes are fed via the decoder 2 to stop the tape reader and also to operate the bistable circuit 5 to changeover the switch 4 to connect the output of the decoder 2 to the instruction store and decoder 3. The tape reader 1 then remains at rest until the time indicated by the master clock 7 which feeds the coincidence detector 8, comprising an assembly of diode AND gates and OR gates, reaches the time indicated in the time store 6 also feeding the coincidence detector. At this instant, the coincidence detector 8 generates a signal which is fed via the hold off circuit 9 to start the tape reader again to pass the signals representing the last two rows of the code sequence on the tape to the decoder 2 which in turn passes them to the instruction store and decoder 3 in the form of the appropriate instruction to actuate the appropriate ones of the bank of relays 10 to cause the desired instruction to be put into operation.

The time store 6 is a cold cathode tube store which can register any time in a twenty-four hour period to the nearest second and the master clock 7 is also a cold cathode tube store fed by pulses at one second intervals from a suitable source 11.

The instruction store and decoder 3 consists of two series of cold cathode tubes, the appropriate tube of the first series storing the first letter of the two letter instruction code and the appropriate tube of the second series responding to the second letter of this code. Upon this latter tube responding to the second letter the associated actuating relay 10 is operated. The decoder 3 circuit is cleared by each pulse from source 11. More than one two letter instruction may be fed to operate the instruction store and decoder 3 within a one-second period, in which case all the relays 10 operated by these plural instructions are cleared down upon receipt of the pulse from source 11. After the two letter code representing the last instruction has been read, the tape reader 1 continues to operate to enter the time for the next instruction in the time store 6, the switch 4 being actuated by the bistable device 5 upon its receipt of the signal representing the precede figure code to connect the decoder 2 to the time store. The tape reader 1 is then switched off until it again receives a signal from the coincidence detector 8 upon the time in the time store 6 coinciding with the time on the master clock 7.

Manual operating controls 12 and 13 are provided for starting and stopping the tape reader. The start control 12 is required when feeding in a new tape and may be used to initiate single instructions at times other than those recorded on the tape.

To advance the timing of any operation to a time before that recorded on the tape, it is necessary to operate the start control 12 and the next instruction on the tape will be fed to the instruction store and decoder 3 and put into operation immediately. Subsequent instructions are not however effected and will be carried out at their recorded times. In order to delay the timing of any operation it is necessary to prevent the automatic operation of the equipment before the recorded time for the instruction occurs on the master clock. For this purpose the output signal from the time coincidence detector 8 is fed through the hold off circuit 9 including solenoid-controlled relay contacts which are normally biassed closed but which are locked in the open position upon operating the hold off control 14 which energizes the solenoid controlling the position of the relay contacts. The circuit 9 can be returned to normal operation upon operating the release control 15 to deenergize the solenoid and thus close the relay contacts. If the time recorded for a given instruction to be put into effect has passed due to the delay produced by the operation of the hold off circuit, then the delayed instruction can only be brought into operation by operating the start control 12 as there will no longer be any coincidence between the time set for the instruction in the time store 6 and the master clock 7.

The area shown within the double line rectangle R on the drawing represents a control panel including the controls and instruments shown. As applied to the circuitry so far described they include the controls 12 to 15, a visual indicator 16 showing the time recorded on the master clock, a further indicator 17 showing the time recorded on the time store 3 and an indicator 18 showing when the hold off circuit 9 is in operation.

To enable an operator to adjust the timing and sequence of the recorded instructions, the apparatus also includes an interval clock comprising an electronic counting circuit employing cold cathode tubes with its time display indicator 20, a transfer store 21, and a midnight detector 22 the operation of which will now be described.

Firstly, a sequence of operations not exceeding a predetermined time, for example of ten minutes duration, can be recorded on the tape at times starting from zero instead of the actual time given by the master clock. On reaching such a sequence the apparatus stops operating and a cue lamp is lit. The sequence of operation of limited duration may now be initiated manually when required. The first instruction of such a sequence will always be preceded by the time cue 00 00 00 representing zero time or midnight and upon reaching such a time cue this figure is fed into the time store 6. The "midnight detector" 22, which is a six way AND circuit then causes two cue lamps 23, 24 to be lit and the next instruction will be held since the master clock does not agree with the time store until midnight. This precludes the use of this facility during a few minutes each day just before midnight but this is not a serious disadvantage in practice. On pressing the interval clock start control 25 the clock changeover switch 26 connects the coincidence detector 8 to the interval clock 19 and starts this running from zero, at the same time the cue lamp 23 is extinguished. The changeover switch 26 comprises a bistable circuit. The first instruction of the sequence is transmitted immediately since both the time store and the clock are reading zero time, and subsequent instructions of the sequence follow at the times recorded with reference to the first instruction. At the end of the limited sequence of instructions normal operation may be resumed by operating the master clock control 27 which changes the switch 26 to reconnect the master clock 7 to the coincidence detector 8, stops and resets the interval clock 19 and extinguishes the second cue lamp 24.

Alternatively the last two letter instruction code at the end of the limited sequence may cause the equipment to revert to normal operation auotmatically.

The two indicator lamps 28, 29 connected to the clock changeover switch 26 show which clock is in use at any time. The cue lamp 23 on the midnight detector is used to indicate that manual action must be taken to initiate the zero sequence and the cue lamp 24 remains on while the sequence is running.

This facility may be employed for initiating the transmission of short items such as news bulletins, advertisements or announcements at the end of or during a break in a television programme of unpredictable duration, such as a sporting event or a public ceremony.

The second facility by means of which the whole programme may be retarded or run in advance of its scheduled timing also uses the interval clock 19. If the interval clock start control 25 is actuated during normal operation of the apparatus, the following events occur in this order:

(*a*) The clock changeover switch 26 connects the interval clock 19 to the coincidence detector 8.

(*b*) The last three digits in the time store 6 are set up on the interval clock by means of the transfer store 21.

(*c*) The interval clock 19 starts running from this figure.

Operations (*a*) and (*b*) should be completed in about 25 milliseconds. However, since this manual operation may occur at any time in relation to the one second timing pulses used in driving the clock, a delay of about 100 milliseconds is introduced before the gate is provided in the interval clock is opened to feed these pulses into the interval clock. This allows time for the coincidence detector 8 to operate and start the tape reader 1 before the clock moves on.

The effect of actuating the interval clock start control 25 during normal operation is therefore to send out the next instruction immediately and to time all subsequent instructions with respect to this for a maximum duration of ten minutes. If instructions occur at sufficiently frequent intervals this period could be made very much longer. In order to delay the programme the same procedure is employed, but the hold off control 14 must also be used to prevent automatic operation until required. For this reason the interval clock start control 25 also releases the hold off relay 9.

When operating in this manner from the interval clock 19, the difference between the times shown by the master and interval clocks indicates the amount by which the programme is running late or in advance.

The cut auto control 30 disconnects the power supply from the actuating relays 10 so that subsequent instructions passed from the instruction store and decoder 3 are ineffective. This control may be employed if one or more recorded instructions are to be omitted. The tape will pass through the tape reader in the normal way but the master controller will have to take over manual control of the programme instructions until it is possible to return to automatic operation by pressing the reset auto control 31 which reconnects the power supply to the actuating relays so that normal automatic operation is resumed.

Whilst a particular embodiment has been described it will be understood that various modifications may be made without departing from the scope of this invention as defined in the appended claims. Moreover it will be appreciated that the invention can readily be employed for controlling other sequences of operations besides its application to the control of television programmes as particularly described.

We claim:

1. An electronic automatic control arrangement for automatically controlling a sequence of operations so that they are carried out at desired times, comprising a recording medium for carrying information representing a series of instructions and the times at which each instruction is to be carried out, a master timing device, a reading device for producing from the recording medium a time at which an instruction is to be carried out, means for storing that time, comparison means for comparing the time stored and the output of the master timing device, means operative upon coincidence occurring between the time on the master timing device and the time stored for operating said reading device to reproduce from the recording medium the information representing the instruction to be carried out at that time and for applying said information to an actuating device which carries out said instruction, said reading device then reproducing from the recording medium the time at which the next instruction is to be carried out and feeding said time to the time store, means for restoring the actuating device to an initial condition after an operation has been carried out, a second timing device which is used to control the carrying out of instructions over a given time period of limited duration commencing at any desired time during the operation of the equipment which cannot be predetermined when the instructions are being set up on the recording medium, switch means for connecting said second timing device to said comparison means and for simutlaneously disconnecting said master timing device and means for operating said switch means upon the starting of said second timing device.

2. An electronic automatic control arrangement for automatically controlling a sequence of operations so that they are carried out at desired times, comprising a recording medium for carrying information representing a series of instructions and the times at which each instruction is to be carried out, a master timing device, a reading device for producing from the recording medium a time at which an instruction is to be carried out, means for storing that time, comparison means for comparing the time stored and the output of the master timing device, means operative upon coincidence occurring between the time on the master timing device and the time stored for operating said reading device to reproduce from the recording medium the information representing the instruction to be carried out at that time and for applying said information to an actuating device which carries out said instruction, said reading device then reproducing from the recording medium the time at which the next instruction is to be carried out and feeding said time to the time store, and said arrangement also including a decoder fed from the reading device and feeding a switch device which selectively feeds information either to the time store or the actuating device depending upon whether the information represents the time at which an instruction is to be carried out or the instruction itself, means for restoring the actuating device to an initial condition after an operation has been carried out, and means enabling the time recorded on the recording medium for any instruction to be carried out to be advanced and retarded, said advancing means comprising a second timing device, means for starting said second timing device, a transfer store, means for feeding the output of the time store to the transfer store and means for feeding the output of the transfer store to the second timing device upon starting the second timing device, and switch means for connecting said second timing device to said comparison means and for simultaneously disconnecting said master timing device whereby the next instruction becomes operative, and said retarding means comprising means for delaying the operation of the reading device and control means for actuating said delay means.

References Cited in the file of this patent

UNITED STATES PATENTS

| | | |
|---|---|---|
| 2,708,337 | Leach | May 17, 1955 |
| 2,965,720 | Bumstead et al. | Dec. 20, 1960 |
| 2,969,427 | See | Jan. 24, 1961 |
| 2,997,702 | Reynolds | Aug. 22, 1961 |